H. B. YOUNG.
DRAFT DEVICE.
APPLICATION FILED MAR. 30, 1910.
986,339.
Patented Mar. 7, 1911.
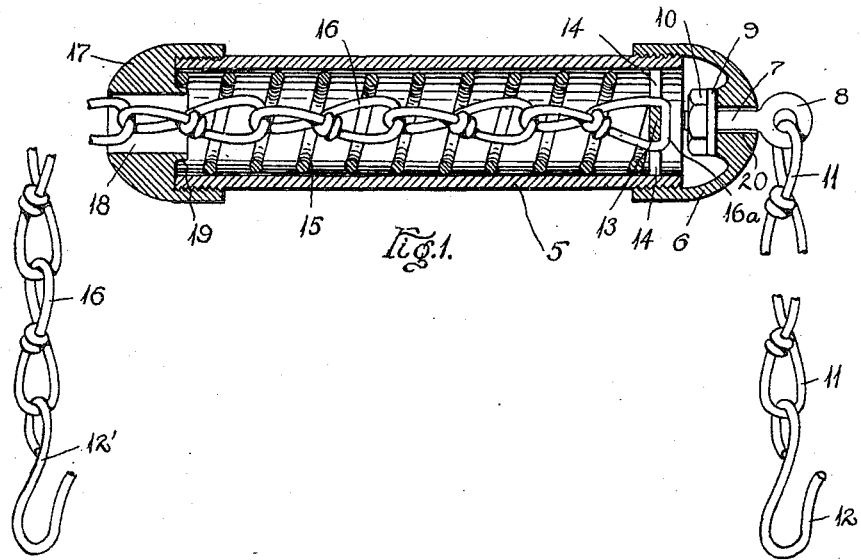
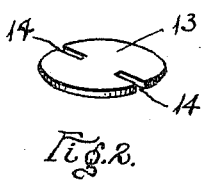
Witnesses:
Monroe E. Miller
S. J. Rockwell
Harry B. Young, Inventor,
By Bommhardt & Co.
Attorneys.

UNITED STATES PATENT OFFICE.

HARRY B. YOUNG, OF CLEVELAND, OHIO, ASSIGNOR OF ONE-HALF TO FREDERICK P. POTTER, OF CLEVELAND, OHIO.

DRAFT DEVICE.

986,339.  Specification of Letters Patent.  Patented Mar. 7, 1911.

Application filed March 30, 1910. Serial No. 552,328.

*To all whom it may concern:*

Be it known that I, HARRY B. YOUNG, a citizen of the United States, residing at Cleveland, in the county of Cuyahoga and State of Ohio, have invented certain new and useful Improvements in Draft Devices, of which the following is a specification.

This invention relates to draft devices, capable of use in various relations, but intended especially for use in connecting a team, a traction engine, or other pulling power to a car, wagon, implement or other object to be hauled.

The object of the invention is to provide an improved spring connection for such draft devices, as more fully described hereinafter.

In the accompanying drawings—Figure 1 is a longitudinal section of the device. Fig. 2 is a perspective view of a sliding head plate forming a part of the device.

Referring specifically to the drawings, 5 indicates a tubular or cylindrical casing which has a cap 6 screwed on one end and a cap 17 screwed on the other end. A chain 16 extends into the casing 5 through a hole 18 in the cap 17, and has a head plate 13 secured to the end thereof. This plate is held at a working fit in the casing, and bears against the end of a coiled spring 15 which is located in the casing and which is seated at its other end against the cap 17, around a raised rim 19 at the inner end of the hole 18. The end link of the chain extends through notches 14 in the head plate 13, the plate being set in place by slipping it partly through the end link $16^a$, and then turning it so that the branches of the link enter in said notches, whereby the plate is attached to the chain and held in proper relation to the spring. Another chain 11 is secured to the eye 8 of the bolt 7 which swivels in the hole 20 of the cap 6, and has an inner washer 9 and nut 10 thereon. The chains 11 and 16 may be provided at their free ends with hooks 12 and 12′, and in the use of the device the chains may be wound around the objects to be connected and the hooks engaged in any one of the links.

What I claim as new is:—

A spring draft connection comprising a casing, a head plate slidable therein and having open notches in opposite edges thereof, a spring confined in the casing and pressing against said plate, and a chain into the end link of which said plate is inserted, with the branches of the link extending through said notches, whereby the chain and plate can be connected or disconnected by slipping the plate into or out of the link.

In testimony whereof, I do affix my signature in the presence of two witnesses, at Cleveland, in the county of Cuyahoga and State of Ohio, this 28th day of March, 1910.

HARRY B. YOUNG.

Witnesses:
 MONROE E. MILLER,
 STEDMAN J. ROCKWELL.

---

Copies of this patent may be obtained for five cents each, by addressing the "Commissioner of Patents, Washington, D. C."